United States Patent [19] — [11] 3,787,891

Moore et al. — [45] Jan. 22, 1974

[54] SIGNAL PROCESSOR INSTRUCTION FOR NON-BLOCKING COMMUNICATION BETWEEN DATA PROCESSING UNITS

[75] Inventors: Brian B. Moore, Wappingers Falls; Andris Padegs, Poughkeepsie; Ronald M. Smith, Wappingers Falls, all of N.Y.

[73] Assignee: International Business Machines Corporation, Armonk, N.Y.

[22] Filed: July 3, 1972

[21] Appl. No.: 268,268

[52] U.S. Cl. .................................. 340/172.5, 444/1
[51] Int. Cl. .............................................. G06f 1/00
[58] Field of Search ....................... 444/1; 340/172.5

[56] References Cited

UNITED STATES PATENTS 3,303,474 2/1967 Moore et al. .................... 340/172.5

*Primary Examiner*—Raulfe B. Zache
*Attorney, Agent, or Firm*—Robert Lieber

[57] ABSTRACT

Control initiating instruction SIGNAL PROCESSOR is used to transfer a select control initiating order designated by the instruction from an initiating unit which executes the instruction to a designated respondent unit which interprets the order. If the respondent unit detects an invalid order or other specific exception circumstance it immediately returns indications of specific exception status to the initiating unit. This status is retained in a register specified by the instruction. The entire transaction is completed during the "short" control sequence of execution of the instruction. Hence the participating units and their interconnections are subject to efficient pre-emptive interruption without further delays for "sense" communication of specific exception status. The identity of the respondent unit and an addend factor of the control initiating order are prepared for quick transfer in registers of the initiating unit designated by information in the instruction. The order representation is formed by adding a portion of the immediate instruction and the above addend factor. Optionally contents of another prepared register designated by the instruction information are subject to transfer with the order code as an ancillary output parameter. Another option permits the user to direct the instruction order to itself for diagnostic or other program usage.

17 Claims, 4 Drawing Figures

FIG. 1

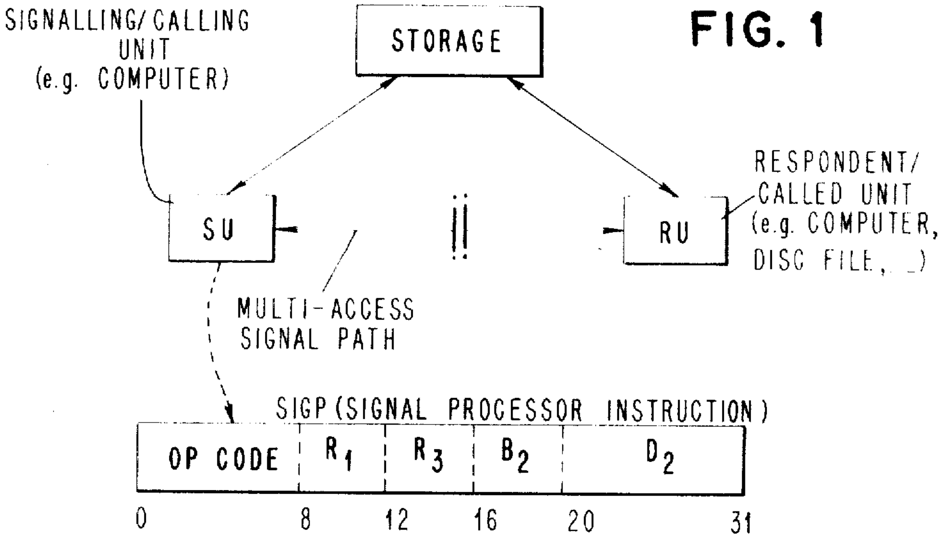

LEGEND:

$R_1, R_3, B_2$ : GENERAL REGISTERS OF SU $[R_1], [R_3], [B_2]$ : CONTENTS OF $R_1, R_3, B_2$ RESPECTIVELY $[R_3]$ = IDENTITY OF CALLED UNIT RU $[B_2] + D_2$ = ORDER CODE (OPERATION TO BE PERFORMED BY RU)

$R_1$: REGISTER TO CONDITIONALLY RECEIVE SUPPLEMENTAL STATUS OF RU WITH EXCEPTION CONDITION RESPONSE OF RU OR AS EXPRESS RESPONSE TO SENSE ORDER

ODD $R_1, R_1+1$; MAY CONTAIN ADDITIONAL INTELLIGENCE SUBJECT TO BE TRANSFERRED TO RU; THE INTELLIGENCE MAY BE SUBJECT EITHER TO VOLUNTARY TRANSFER BY SENDER SU OR DEMAND-RESPONSIVE TRANSFER AT RECEIVER REQUEST

FIG. 3

FEATURES

F1/ RELEASE MECHANISM
F2/ INTEGRITY OF OPERATION
F3/ SYST LEVEL PRE-EMPTABILITY
F4/ PATH, DEVICE LEVEL PRE-EMPTABILITY
F5/ RANGE OF FUNCTIONS AVAILABLE
F51/ TRANSFER ORDER CODE ONLY
F52/ IMMEDIATE DATA TRANSFER
F53/ FAST RELEASE WITH OVERLAPPED DATA XFER
F54/ SLOW RELEASE OPTION
F55/ TOTAL DATA TRANSFER OPTION

| | F55 | F54 | F53 | F52 | F51 | F5 | F4 | F3 | F2 | F1 |
|---|---|---|---|---|---|---|---|---|---|---|
| SIGP WITH ADDED DATA OPTION | Y | Y | Y | Y | Y | Y | Y | Y | Y | Y |
| SIGP NO ADDED DATA OPTION | – | – | – | – | Y | – | Y | Y | Y | Y |
| SIO | – | S | – | – | S | – | – | – | Y | Y |
| SIOF | – | S | S | – | S | – | – | – | Y | Y |
| RDD / WRD | – | – | – | B | Y | – | – | Y | – | – |
| RDDW / WRDW | – | – | – | S | Y | – | – | Y | – | – |
| 7090 | – | – | Y | – | – | – | – | Y | P | P |
| 1410 | Y | Y | – | – | – | – | – | Y | Y | Y |

Y FUNCTION AVAILABLE
– FUNCTION NOT AVAILABLE
S FUNCTION AVAILABLE; REQUIRES MORE STORAGE REFERENCES
B SINGLE BYTE TRANSFER ONLY; REQUIRE STORAGE REF.
P FUNCTION PROGRAMMABLE

PATENTED JAN 22 1974 3,787,891

SHEET 4 OF 4

SIGNAL PROCESSOR INSTRUCTION FOR NON-BLOCKING COMMUNICATION BETWEEN DATA PROCESSING UNITS

CROSS REFERENCE TO RELATED APPLICATION

U.S. Pat. application Ser. No. 268,959 entitled "Operation Request Block Usage," filed July 5, 1972 in behalf of Brian B. Moore.

BRIEF SUMMARY OF THE INVENTION

The invention pertains to input-output control initiating instructions for data processing systems. The subject instruction SIGNAL PROCESSOR (SIGP) executable by control initiating units facilitates pre-emptive interruption of initiating and respondent units as well as connection elements between units in dynamic interactive systems.

When compared to other input/output control initiating instructions SIGNAL PROCESSOR offers distinct advantages of speed and flexibility in situations calling for quick release of inter-unit connections and/or ability to accommodate pre-emptive interruption of initiating and/or respondent units in an effective recoverable manner.

With the Operations Request Block usage method described and claimed in the above cross-referenced application the number of serially reusable resources (shared facilities allocatable to one user at a time) engaged in the control initiating transaction is significantly reduced; thereby improving the efficiency of the system in respect to pre-emptive interruption. Comparatively, the START I/O instruction of known usage references plural status words held in fixed address storage spaces, thereby potentially lengthening the time during which the initiating and respondent units may be unable to accept pre-emptive interruption. Similarly, the conventional peripheral device attachment interface is so organized that pre-emptive interruption of multiplex peripheral device functions entails possibility of contention (hangup), as well as considerable time delay and programming overhead.

A characteristic feature of the subject instruction and the operation of associated initiating and respondent units is that all information required to identify the object respondent unit and the function (order code) to be performed by the latter are designated either directly in the instruction intelligence or indirectly in a designated pre-loaded general (working) register of the initiating unit executing the instruction. Thus, initiation of unit connections during the control initiating transaction need not be delayed by references to addressable storage spaces requiring longer access intervals than general registers.

Another feature of the instruction and the associated system function is that another general register of the initiating unit is designated as a provisional buffer for specific exception status of the respondent unit in the eventuality that the response of the latter to the order code denotes exceptional condition requiring specific characterization (for instance detection of an invalid or erroneous order code).

The foregoing and other features, characteristics, objects, advantages and underlying assumptions of the present invention will be more fully appreciated and understood by considering the following particular description thereof.

DESCRIPTION OF THE DRAWINGS

FIG. 1 illustrates the applicational system environment and code format of the subject instruction SIGP.

FIG. 3 provides comparison in tabular form between functions performed by other known input/output initiating instructions and processing systems.

DETAILED DESCRIPTION

Introduction

Figure 2:
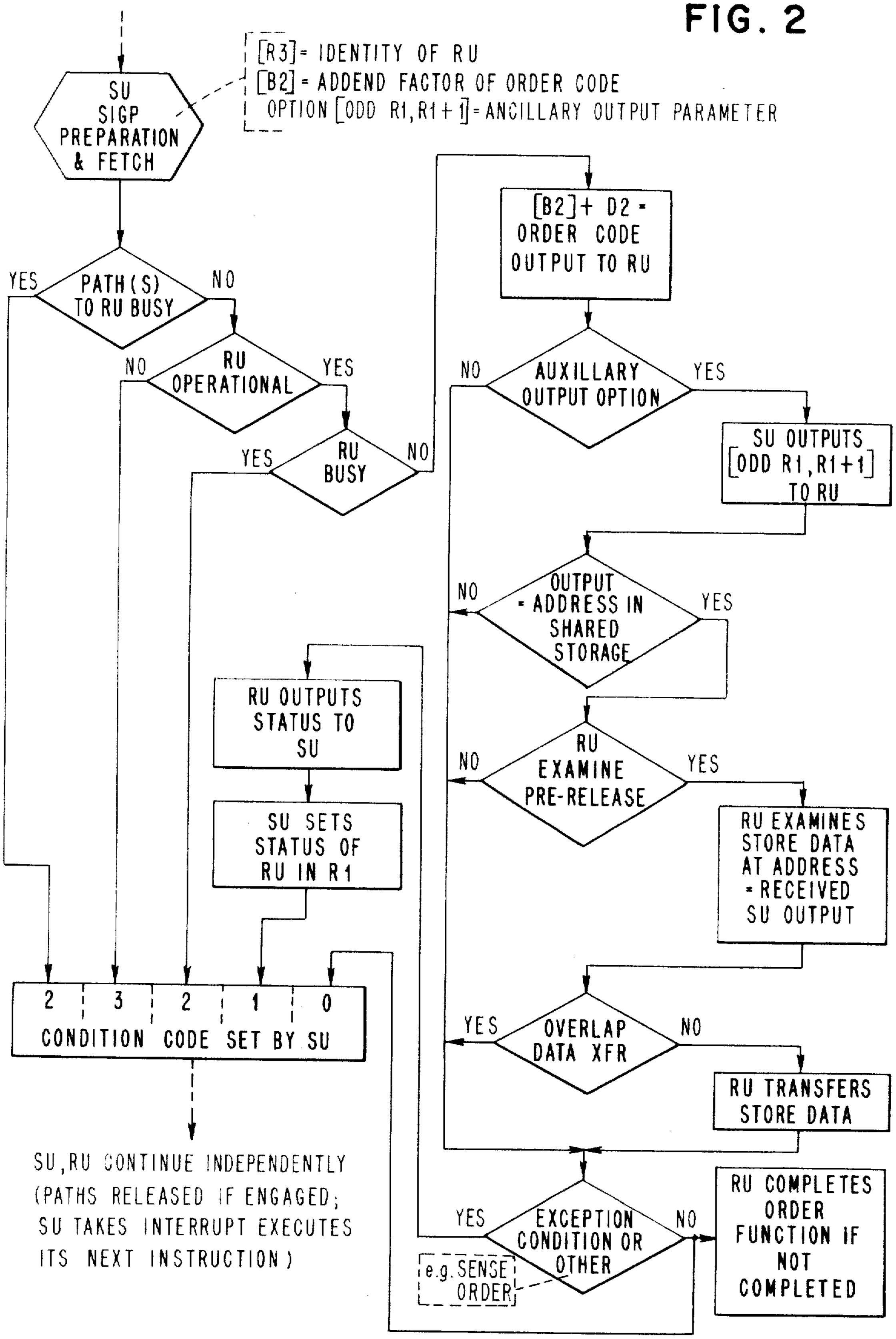
FIG. 2 illustrates the control flow sequence characteristic of initiating/respondent unit operations during execution of the SIGP instruction by the initiating unit.

As indicated in FIG. 1, the subject invention contemplates a system environment including one or more initiating units SU and one or more respondent units RU adapted for connection for control initiation. The connection element (signal path) may be accessible to other units (although this is not a requirement) or to multiplex signal traffic of the subject units SU, RU. The units have separate access to the illustrated shared storage facility.

Units SU are instruction controlled units (e.g. CPU's) capable of executing the subject control initiating instruction SIGP. Units RU may be input-output channels, adapters, subservient peripheral devices or even other CPU's. Units RU are adapted to control functions associated with order codes transferred from SU during execution of SIGP instructions. The connection element or signal path may be any channel or means of signal communication; for instance a wire, a time channel of a time division multiplex band, a frequency channel of a frequency band, etc. It may even include off-line storage. SU and RU may be one and the same unit in certain instances discussed later.

Hereafter the initiating unit SU may also variously be designated as sender, sending unit, subject unit, controlling unit, signalling unit, caller, calling unit, CPU or executing unit (the last in reference to its execution of the subject instruction). Similarly, the respondent unit RU may also variously be termed receiver, receiving unit, object unit, controlled unit, called unit, or order-responsive unit.

The operating environment may also comprise a multi-processing system in which multiple computing units (CPU's) variously acting as initiating and respondent units engage in control initiating signal transactions relative to each other by executing subject SIGP instructions.

It is assumed that the person skilled in the art to which the invention pertains is one having extensive acquaintance with the hardware and software organization and operation of the IBM System/360 and IBM System/370 Data Processing Systems including the peripheral device interfaces thereof and the handling of input-output functions therein. Organizational and hardware/architectural aspects of these systems are variously described in "IBM System/360 Principles of Operation" Form A22-6821, File S360-01, "IBM System/370 Principles of Operation" Form GA22-7000, and one or more of the available publications relating to particular system models (IBM System/360 Models 20, 25, 30, 40, 50, 65, 67, 75, 95 and System/370 Models 145, 155 and 165). Familiarity with the organization and function of the associated Operating System (OS) software is also assumed. In regard to OS software, teachings of the following publications are incorporated herein by the following reference:

IBM System/360–370 "OS Release 20," Forms:
- GC28-6534 "Introduction to OS"
- GC28-6535 "OS Concepts and Facilities"
- GC28-6628-6 "System Control Blocks"
- GC28-3746-0 "Operating System Data Management Services"
- GC28-6647-5 "Supervisor and Data Management Macroinstructions"

"IBM System/360–370 DOS:"
- GC24-5030-9 "Concepts and Facilities"
- GC24-3427-7 "Data Management Concepts"
- GC24-5036-6 "System Control and System Service Programs"
- GC24-5037-10 "Supervisor and Input/Output Macros"

Instruction Format/Information Content

Referring to FIG. 1, a preferred exemplification of the subject instruction SIGNAL PROCESSOR, abbreviated SIGP, consists of a 32 bit word in which 8 bits designate an operation code, three sets of 4 bits designate three respective general registers R1, R3, B2 of the executing-initiating processor and 12 bits designate a quantity D2 used as an addend factor of the order code. One of the designated general registers R3 contains (as a consequence of earlier handling or loading) the identity of the respondent/object unit RU. The order code designating the intended function to be initiated by RU is formed by adding D2 and the contents of B2. It should be understood that the general registers of the executing unit are registers which are more quickly accessible during normal operation than the addressable storage spaces of the system (i.e. main or other storage) and are subject to "saving" and "restoration" transfer operations relative to the latter during pre-emptive interruption of the initiating unit.

OPERATION OF THE INSTRUCTION

Figure 4:
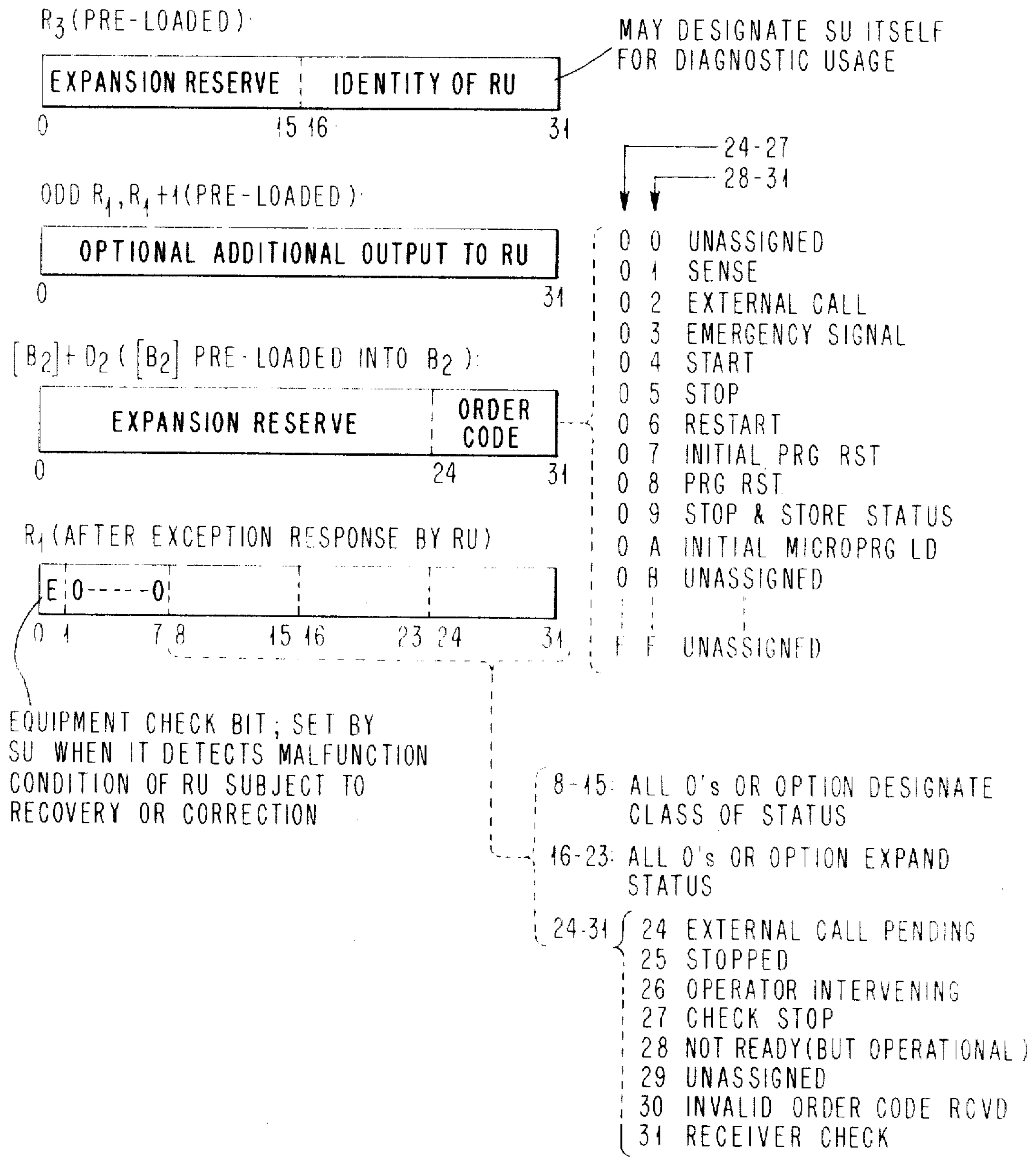
FIG. 4 illustrates general register and arithmetic logic usage, as embodied in the implementation for simple CPU signalling.

Referring to FIGS. 1, 2 and 4, the specific control sequence of operation for execution of SIGP is as follows:

Prior to execution general registers R3 and B2 (and optionally the odd one of R1, R1+1) are appropriately loaded (by operations of load instructions or otherwise) with the requisite information. The content of R3 (written as [R3]) designates the identity of the receiving unit RU. The order code represented by the sum of [B2] and D2 is subject to conditional transfer to and interpretation by RU for control initiation. When the 4 bit field, B2, is zero, the quantity D2 represents the order code. Specification by the B2 field of a register, other than zero, provides expansion and adaptability reserve in reference to specification of the order code.

The register designated by the odd number of the pair R1, R1+1 is subject to optional loading with information subject to output transfer to and ancillary handling by the respondent unit. This ancillary information, in the simplest sense, is a data word. However it may also be subject to usage by the receiver as an address designating a storage area or space accessible to the receiver. In the latter instance the data in the designated space may include or refer to program information (e.g. I/O commands, etc.)

In the above-reference co-pending patent application of Brian B. Moore, the transferred ancillary output word is subject to interpretation as an address pointer associated with a reference word position within a multi-word block segment of storage denominated Operation Request Block (ORB). This block is indicated to be subject to allocation and usage by the Supervisor Program of the initiating unit to enable a paired respondent unit to process information in or out of storage incidental to a dispatched task of a problem program of the initiating unit and to link the task to the processed information; all with a high order of pre-emption efficiency.

It will be understood that the pre-loading of R3, B2 and odd R1, R1+1 may be accomplished through program instructions.

Register R1 specified in SIGP is subject to unique conditional usage, during execution of the instruction, as retention buffer for specific exception status intelligence of the respondent unit presented and entered in response to a transferred SIGP order code (e.g. intelligence to indicate error in the order code, pendency of higher priority function, etc.).

The control sequence of the SIGP instruction operation is indicated in FIG. 2. The arrangement of the general register information, as embodied in the implementation for simple communication with another CPU, is shown in FIG. 4. The requisite sequence control hardware will be apparent to those skilled in the subject art; for instance, in a microprogrammed system, this would comprise a sequence of conventional microinstructions appropriate to the tasks of operating the conventional signal gates and arithmetic elements of the executing unit to produce the order code (sum of [B2] and D2) and to provide the signal flow and control initiating signal transactions next described.

The SIGP instruction is fetched and decoded initiating attempt by the executing/calling unit to establish connection with the object unit RU (= [R3]). If connection is unavailable or if the object unit is busy condition code 2 is set internally; for instance in appropriate internal condition triggers of the executing unit, and the operation is quickly terminated. Naturally the instruction transaction may be subject to later repetition via a program branch conditioned upon the existence of a condition code 2 setting.

If the object unit is not operational (e.g. malfunctioning, disconnected or non-existent) condition code 3 is set and connection to RU is released. Naturally this occurrence would be subject to subsequent evaluation by diagnostic and recovery programs of the executing unit. If the called unit is operational, the order [B2] + D2 is presented over the connection. RU examines the code and provides a return indication to SU during the instruction execution sequence. Condition code 0 is set in SU when a simple acknowledgment response is detected and condition code 1 is set when RU indicates that additional information, normally in the form of specific exception (sense) status conditions is returned. It is within the purview of our invention, however, to have other additional information in the form of immediate data also presented in this manner for certain order codes. As a condition precedent to the setting of the exception condition code 1, the additional information from the RU is presented to SU and entered into register R1 of SU designated by the instruction. This Sense status is subject to retention for diagnostic or repetition usage; e. g. for error recovery if the exception condition response is due to correctible error, or for diagnosis of uncorrectible error, or for repetition of the SIGP operations, etc. Upon entry of the information into R1; both SU and RU, and the connection path, become subject to pre-emptive interruption and the execution of the instruction may be terminated.

The order code is subject to interpretation by RU (it is contemplated for instance that different receivers may be adapted to perform different functions in response to like codes). In each instance above setting of the condition code concludes the SIGP operation and prepares the initiating unit SU for interruption or execution of its next instruction. In each instance, the setting of the condition code also concludes the control initiating transaction of the SIGP operation to the extent that it has been performed and leaves the calling unit, called unit and connection path (if one has been established) subject to pre-emptive interruption; hence the basis for earlier characterization of SIGP as subject to non-blocking quick release usage.

Upon receipt of the order code RU may also receive the ancillary output of SU [odd R1, R1+1 of SU] as previously explained. If this information represents a storage address there are two system options suggested in FIG. 2. One is that RU may retain the address information for reference after severance of the SIGP connection with SU. The other contemplates that RU will refer to the designated storage address while still connected with SU. In the latter circumstance additional options considered include the possibility of RU transferring (reading or writing) data relative to the ancillary address of storage while still connected with SU (overlapped data transfer).

At any stage of SIGP control sequence handling above RU may communicate exception condition indication to SU and when it does so it also presents corresponding specific exception status indication over the SIGP connection which SU enters into register R1 designated in the SIGP instruction information prior to setting the exception condition code 1. If SU detects other than exception response from RU it sets condition code 0, 2 or 3 depending upon the response and severs the connection with RU if one has been made. If the order code transferred to RU calls for further operations, RU proceeds to execute these independently while SU proceeds independently with its programmed functions.

In general, condition codes and specific exception status are subject to retention and further handling and interpretation by SU; for example through interruption programming.

Observe that since the respondent unit furnishes specific exception status directly to the initiating unit as an operation of the initiating instruction the possibility of queueing of exception status in the connection facility does not exist. Consequently, the possibility that severance of connections and pre-emption may be delayed or blocked by additional exception tracing operations is also non-existent.

An Implementation Example of Order Codes and Exception Status

The following is an example of the use of SIGP as implemented for simple CPU signalling.

Order codes and their normal interpretations, indicated in FIG. 4, constitute 8 bit sections of the 32-bit sums ±B21 + D2. Bits 24–31 are the order code and bits 0–23 set to all 0's in the present exemplification constitute reserve for expansion of order code permutation possibilities. Bits 24–27 and 28–31 are treated as hexadecimal digits each ranging over the set of 16 values 0,1,...,9,A,B,...,F. Assigned functions are defined specifically as follows:

Sense: The addressed respondent unit is ordered to present its specific exception status subject to conditional entry in R1 of the calling unit. Meanings of status bits in R1 are defined below. If status other than all zeros is stored in R1 condition code 1 is set in the calling unit; otherwise, condition code 0 (i.e. no exception) is set.

External Call: An "external call" external-interruption condition is generated at the addressed respondent unit which is a CPU. The associated interruption is scheduled to occur when the addressed unit is interruptible for this condition and need not necessarily occur during the execution of the SIGNAL PROCESSOR instruction. The address of the initiating-sending CPU, along with the interruption code, is provided to the addressed unit for use when the interruption occurs. Only one external-call condition is kept pending in a CPU at a time.

Emergency Signal: An "emergency-signal" external interruption condition is generated at the addressed unit which is a CPU. The associated interruption is permitted to occur when the addressed CPU is interruptible for this condition and need not necessarily occur during the execution of the SIGNAL PROCESSOR instruction. The address of the CPU sending the signal is provided along with the interruption code for use when the interruption occurs. Only one emergency-signal condition is allowed to be maintained per sending CPU.

Start: The addressed CPU is ordered to place itself in the Operating state. The addressed CPU need not necessarily enter the Operating state during the execution of the SIGNAL PROCESSOR instruction. No action is caused at the addressed CPU if that CPU is in the operating state when the order code is accepted.

Stop: The addressed CPU is ordered to be placed in the Stopped state. It need not necessarily enter the Stopped state during the execution of the SIGNAL PROCESSOR instruction. It should however enter the Stopped State at the completion of execution of the current unit of operation and after taking all pending interruptions for which it is enabled. No action is caused at the addressed CPU if that CPU is in the stopped state when the order code is accepted.

Restart: The addressed CPU performs the Restart function. Its current PSW is stored in fixed storage location 8 and subsequently the contents of fixed storage location 0 become its new current PSW. If the addressed CPU is in the Operating state when the order code is accepted, the exchange (swap) of PSW's occurs at the completion of execution of the current unit of operation and after all pending interruptions for which the CPU is enabled have been taken. If the addressed CPU is in the Stopped state when the order code is accepted, it enters the Operating state and exchanges the PSW's without first taking any pending interruptions.

Initial Program Reset: The Initial Program Reset function is performed by the addressed unit (CPU). The execution of the function does not affect other CPU's and does not affect I/O channels which are not configured to the CPU being reset. The Reset operation need not be completed during the execution of the SIGNAL PROCESSOR instruction.

Program Reset: The Program Reset function is performed by the addressed CPU. The execution of the function does not affect other CPU's and does not affect I/O channels which are not configured to the CPU being reset. The reset operation need not be completed during the execution of the SIGNAL PROCESSOR instruction. The function is the same as performed by pressing the System Reset key of the addressed CPU with the Enable System Clear key in the normal position, except that the Reset signal is not propagated to other CPU's.

Stop and Store Status: The Stop operation is performed, followed by the Store Status operation. The addressed CPU need not complete the operation, or even enter the Stopped state during the execution of the SIGNAL PROCESSOR instruction.

Initial Microprogram Load: The Initial Program Reset function is performed and the Initial Micropro-gram-Load function is initiated. The latter function is the same as that which is performed through Manual Initial Microprogram Load. If the Initial Microprogram Load function is not provided in the addressed CPU, the function code is treated as unassigned and invalid. The operation need not be completed during the execution of the SIGNAL PROCESSOR instruction.

Exception Bit Definition

Exception status bits receivable in R1, of the initiating unit represent and are subject to retention and handling as program status information. These bits are shown in FIG. 4 and defined more particularly as follows:

Bit 0 — Equipment check bit; when set to 1 provides indication to the calling unit of errors affecting only the execution of the immediate SIGP instruction (in contrast to bit 31 providing reference indication to the called unit). Can be subsequently evaluated via Machine Check interruption in the calling unit.

Bits 1–7 — Unused; all 0's.

Bits 8–15 — Either unused (all 0's) or used to designate class of exception status stored in bits 24–31.

Bits 16–23 — Unassigned (all 0's) or expansion reserve.

Bits 24–28 — When set indicate the presence of the corresponding condition in the addressed receiver at the time the SIGP order code was received. These indications are provided only in response to the Sense order or in exception circumstances precluding successful performance of the control function designated by the order code.

Assigned functions, definitions and purposes of exception bits 24–31 are indicated specifically as follows with reference to FIGS. 2 and 4:

External Call Pending: This bit is set to 1 when an external-call condition is pending for interruption of the receiver; e.g. due to a previously issued SIGNAL PROCESSOR instruction. The pending condition may be due to signalling from the same or another sender. The condition, when present, is indicated in response to Sense and External Call orders. Additionally, for External Call it means that the requested interruption condition has not been generated in the receiver.

Stopped: This bit is set to 1 when the receiver is in the stopped state and the order code specifies Sense.

Operator Intervening: This bit is set to 1 when the receiver is executing certain operations initiated from its console or remote operator control panel. The particular manually initiated operation that cause this bit to be turned on in the sender will depend on the type of receiver unit and the function specified. It is understood that the specified order function cannot be performed and will not initiate. Operator-Intervening status can be signalled as exception response to any order code function.

Check Stop: This bit is set to 1 when the receiver is in the Check Stop state. The specified order function cannot be performed and is not initiated. The condition, if present, is indicated in response to all assigned functions except IMPL, program reset, and initial program reset.

Not Ready: This bit is set to one when the addressed receiver uses reloadable control storage to perform the specified order function and the required microprogram is not present. Therefore the function is not initiated. The condition, if present, is indicated in response to all assigned functions except Initial Microprogram Load.

Invalid Function: This bit is set to one when the addressed receiver receives an unassigned order code. No function is performed at the addressed CPU. When the receiver is in the Operator-Intervening state, Check-Stop state, or Not-Ready state, either Invalid Function or the corresponding state condition, or both may be indicated.

Receiver Check: This bit is set to one when the addressed CPU detects malfunctioning of equipment during operations associated with the execution of SIGNAL PROCESSOR, including reception and interpretation of the order (function) code. This condition can be signalled in response to any function code and indicates that the execution of the function has not been and will not be initiated. The order status bits need not necessarily be valid. A Machine-Check condition may or may not have been generated at the receiver.

Programming Notes

A CPU can obtain the following functions by addressing SIGNAL PROCESSOR to itself:

1. Sense order permits the CPU to store in designated R1 indication of whether an External-Call interruption condition is or is not pending.
2. External Call and Emergency Signal orders enable the corresponding interruption conditions to be generated. External Call can be rejected because of a previously generated External Call condition.
3. Start sets condition code 0 and has no other effect.
4. Stop causes the CPU to set condition code 0, taking pending interruptions for which it is enabled, and enter the Stopped state.
5. Restart provides a means to store the current PSW.

Hardware Notes

The Equipment Check bit (bit 0 of R1 when exception condition code is set) and Receiver Check bit (bit 31 of R1) provide a means of signalling malfunction to the sender. Additionally, when the Receiver Check bit is turned on it is subject to being made available to the receiver so that the receiver can take a Machine-Check interruption to record a logout concerning the hardware malfunction. When the equipment check bit is turned on, the CPU executing SIGNAL PROCESSOR can take a Machine-Check interruption to examine further the circumstances of the malfunction.

Comparison (FIG. 3)

The table of FIG. 3 compares the relative capabilities of SIGP to other known control initiating instructions and processor configurations. In this comparison, "No Added Data Option" refers to the order code functions as detailed in FIG. 4; "Added Data Option" refers to the full range of functions for which the order code functions provide, including the type of usage achieved in the SIGP operation with ancillary reference to odd R1, R1+1 for communication data; as described above and in the above cross-referenced patent application of Brian B. Moore.

With the complete ORB ancillary option described in the above Moore application, all functions indicated in the columns of the table (and described below) are available to the user system. With less than all of these options, some of the functions are unavailable.

All but the last two comparands are instructions of known usage. The comparands are defined as follows:

SIO: Start I/O

SIOF: Start I/O Fast Release

RDD: Read Direct

WRD: Write Direct

RDDW: Read Direct Word (Mod. 44)

WRDW: Write Direct Word (Mod. 44)

7090: Refers to 7090 Computer System

1410: Refers to 1410 Computer System

Functions (columns) of the table are defined with reference to FIG. 3 as follows:

F1: Refers to a mechanism to prevent "hangup" of the calling unit, as achieved in SIGP operation by the setting of condition code 3 to indicate that a non-responsive receiver is not operational (not in service or non-existent).

F2: Integrity of operation refers to presentation and retention of receiver specific exception status as part of the operation, thus alerting the issuer when failures or abnormal situations occur.

F3: Refers to capability of calling system to accept interruption quickly before and after executing SIGP. This is due to the fact that all parameters of the SIGP instruction are prepared in or subject to transfer to (in the case of specific receiver exception status) general registers of the calling system. The usual practice of locating such information in system storage, especially in fixed address locations, is more apt to create contention delay situations.

F4: Refers to capability of called unit to accept interruption and of the connection path to be released after SIGP execution without loss of integrity of communication between the calling and called units in respect to exception status of the called unit. In previous practice such information often could be left pending in a common portion of the path thus making preemption to use the common portion impossible. For example; error indicators or interruptions left pending in the channel, status and sense information left in the control unit, contingent connections in the two channel switch. In SIGP operation the exception condition is set only after the relevant exception status information has been entered into the internal register R1 of the sender, the path and device are thus free of special contingencies which would impare pre-emption.

F5: Refers to wide range of functions attainable with the single program compatible SIGP instruction. These functions include, for instance, the optional use of SIGP with or without ancillary reference to odd R1, R1+1, and the options listed in F51 through F55 below.

F51: Refers to the mechanism for simple signalling, where no data transfer is necessary, without requiring unnecessary storage references.

F52: Refers to the type of ancillary data transfer achieved in SIGP operation through reference to odd R1, R1+1. The defined usage of this parameter is intended to be broad enough to permit the receiver to request the ancillary transfer or the sender to volunteer same.

F53: Refers to the type of extended communication handling which occurs when the parameter in odd R1, R1+1 is subject to handling as a storage address. It is contemplated that the receiver unit involved in a SIGP transaction can be adapted to interpretively use such addresses to locate other information (e.g. a list of channel command words CCW's in the case of an I/O channel receiver).

F54: This function, available for optional incorporation in systems having total ancillary option SIGP permits delaying of the release of the sender under control of the receiver until data in the storage area referenced by the contents of odd R1, R1+1 is referenced and examined by the receiver. This is useful to inform the sender of conditions that may prohibit successful completion of the overlapped data transfer.

F55: Similar to F54 except release signal need not be given until all relevant data at the referenced storage address has been successfully acquired from storage by the receiver.

While the invention has been particularly shown and described with reference to a preferred embodiment thereof, it will be understood by those skilled in the art that the foregoing and other changes in form and details may be made therein without departing from the true spirit and scope of the invention.

What is claimed is:

1. In a data processing system including a controlling unit and a controlled unit, the latter unit subject to preemptive interruption and subject to cooperative connection with said controlling unit for control initiation, said controlling unit having plural registers subject to direct specification by program instructions, the method of controlling input/output signal traffic between said controlling and controlled units which comprises:

enabling said controlling and controlled units to cooperate under control of a single control initiating instruction (SIGP) executable by the controlling unit to effect transfer of program specifiable control initiating order code information from the controlling unit to the controlled unit and responsive transfer of either acceptance indication or specific plural bit exception status indications from the controlled unit to the controlling unit such that further status sensing communication between said controlling and controlled units is never required after execution of said instruction; and enabling said controlling unit to store said responsively transferred exception status indications in accordance with information specified by said instruction, all within the time required to execute said instruction in the controlling unit.

2. Input/output control method for a data processing system in accordance with claim 1, which includes the step of storing the returned exception status information by transferring it to one of said plural registers.

3. Input/output control for a data processing system in accordance with claim 1, wherein said control initiating order code information is a representation of a select one of a plurality of predetermined order codes, which includes the step of operating said controlled unit conditionally in response to said order code information to perform a select one of a plurality of distinct operations associated with said codes.

4. A method according to claim 3, which includes the step of operating said controlling unit to produce said order code representation by arithmetically manipulating information contained in the immediate code field of said instruction.

5. A method according to claim 1, which includes the step of adding first and second digital information representations to produce a result constituting said order code information; the first information representation being derived by direct reference to the information field of said instruction and the second representation being obtained by reference to a working register which is one of said plural registers of said controlling unit specified by register designating intelligence in said instruction information field.

6. A method according to claim 1, wherein said step of enabling said controlling and controlled units to cooperate comprises operating said controlling unit to transfer an ancillary information parameter to said controlled unit in addition to said control initiating order code information during execution of said instruction.

7. A method according to claim 6, which includes the steps of preparing said ancillary information parameter in a specific one of said plural registers prior to execution of said instruction and transferring said parameter from said specific one of said plural registers to said controlled unit during said execution; said specific one of said plural registers being designated by information in said instruction.

8. A method according to claim 7, which includes the step of operating said controlling unit to interpret the information designating said specific one of said registers as an integer representation which is either odd or even and if odd causing said controlling unit to interpret it as the locating designation of the register containing the said ancillary information parameter and if even causing said controlling unit to increase the value thereof by a unit increment and interpret said increased value as the locating designation of said register containing the ancillary information.

9. A method according to claim 7, wherein said ancillary information comprises an address representation of a storage space in a storage facility associated with an operation to be performed by said controlled unit and and including the step of causing said controlled unit to effect access to said space by means of said ancillary information.

10. In a multiprocessing system including a plurality of data processing units a method of controlling communication of information between said units comprising arranging each unit to be capable of initiating control of the other units by executing a control initiating program instruction SIGP of predetermined form, said instruction containing information designating a specific one of said other units and a control initiating order code representation of predetermined form, said instruction causing said order code information to be transferred on certain conditions to said designated one of said other units, said order code information designating an operation to be performed by the said one of said other units and operating as a command subject to causing said one of said other units to conditionally perform said operation; said instruction information also designating two registers of the unit executing the instruction, one register subject to being prepared with information designating the said one of the other units and the other register designated during execution of the instruction to conditionally receive and retain specific exception status information of the said one of the other units in the event that the other unit is unable to perform the operation designated by said order code after receiving said order code.

11. In a multiprocessing system a method according to claim 10 of controlling inter-unit communications comprising conditioning each said unit which is designated as a said specific one of said other units to be able to produce and conditionally transfer indication of said specific exception status information thereof to said unit executing said instruction during the execution of said instruction whereby said communicating units are subject to pre-emptive interruption virtually immediately after execution of said instruction without need for further communication to effect transfer handling of said specific exception status information; said exception status information of the other unit being subject to handling by said unit executing said instruction, after execution of said instruction, as ordinary program status information of the executing unit.

12. In a data handling system including multi-accessible signal conveyance means and multiple data processing units adapted for signal intercommunication via said conveyance means, the method of controlling inter-unit communication comprising:

arranging at least one of said units to be able to operate as a controlling unit by executing a control initiating instruction of predetermined form specifying: a particular other one of said units to be selectively called by the controlling unit, a particular order code intended to represent a select one of a plurality of functions performable by the specified other unit and a particular internal register of the said controlling unit representing a buffer entry position reserved for specific exception status information furnishable by the specified other unit in the eventuality that said other unit should be available and operational but have exception to the other code; causing said controlling unit to execute said instruction by performing in succession: a calling operation seeking to establish connection to said called unit through said conveyance means, a conditional transfer operation seeking to effect transfer of said order code to said specified other unit if said other unit and a signal path thereto in said conveyance means are available for communication, conditional response operation seeking to effect solicitation and acquisition of said specific exception status information of the other unit and entry thereof in said buffer entry register of said controlling unit, said acquisition and entry conditional upon said other unit having exception status relative to said order code, and setting operation to effect setting of a condition code in said controlling unit indicative of the status of completion of said calling operation and of the operation designated by said order code; said controlling unit and other unit being free to accept program interruption upon completion of the said condition code setting even when said other unit has exception status.

13. For a data processing system including an instruction executing unit subject to control initiating signal exchange connection with a plurality of respondent data handling elements the method of effecting control initiation comprising organizing the executing unit to execute control initiating instructions SIGP designating one of said respondent elements, each execution of SIGP comprising a sequence of control initiating operations encompassing in succession: a connection establishing operation seeking to establish temporary selective connection of the executing unit to the designated respondent data handling element, followed by a condition code setting operation in the executing unit, followed by severance of the temporary connection if established, said condition code subject to representing any one of the following conditions:

Condition Code 0: Connection completed, no exception status in the respondent element.

Condition Code 1: Connection completed, exception status in the respondent element.

Condition Code 2: Connection incomplete; respondent element or means to effect connection therewith in busy condition of operation.

Condition Code 3: Connection incomplete; respondent element or means to effect connections therewith not operational;

manifestation of conditions giving rise to either said 0 or 1 condition code setting causing said executing unit to operate to transfer order code intelligence designated by the instruction from the executing unit to the respondent element intermediate said calling and condition code setting operations;

presentation of said order code by the executing unit causing said respondent element to operate conditionally to manifest specific exception status information to said executing unit the form of which is conditional upon interpretation of said transferred order code intelligence by said respondent element;

manifestation of said exception status causing said executing unit to enter said specific status into a register of the executing unit designated by the said instruction; thereby permitting said specific status to be saved subject to process handling as if it were internal status of the executing unit after severance of said connection.

14. In a data processing system including multiplex signal conveying means and at least two processing units subject to dynamic interconnection via said means, one of said units having capability to execute control initiating instructions relative to other units and having multiple general registers available for designation by and use in effecting execution of said instruction; others of said units having execution capability in respect to order operations represented by order code functions transferrable from said one unit to said other units through operation of said initiating instructions; the method of controlling communication between said one and other units comprising:

enabling said one unit to execute a particular control initiating instruction SIGP designating:

a. identities of first, second and third registers of the one unit containing by convention pre-loaded first, second and third operand factors;

b. a fourth operand factor associated with the second operand factor; and c. a fourth register of the one unit subject to storage of exception status;

the instruction operation encompassing:

1. said one unit attempting to establish signalling connection, conditional upon availability of a suitable path in said conveying means, between the one unit and a select one of the other units designated by the third operand factor.
2. conditional upon establishment of said connection, said one unit producing and transferring control initiating order information to said select other unit; said order information represented by the sum of said second and fourth operand factors;
3. conditional upon its being available said select other unit interpreting said transferred order information and transferring a responsive indication of either a first or second kind to said one unit; said indication of first kind representing non-exception status and said indication of second kind representing exception status of the other unit and including information identifying a specific one of a plurality of possible exception status circumstances;
4. conditional upon its receiving indication of said second kind said one unit entering said specific exception status information into said fourth register of the one unit;
5. said one unit ultimately setting a condition code internally to indicate concluding status of the foregoing control initiating transfer transaction.

15. A method according to claim 14, wherein said control initiating transaction of said instruction operation includes an additional step of said one unit conditionally transferring ancillary output information from said first register of the one unit to the select other unit conditioned upon said other unit being available and operational.

16. Method according to claim 15, including the step of establishing the location of said first register by reference to an integer representation in the immediate field of the control initiating instruction, said first register location being said integer representation if the value of said representation is odd if the value of said integer representation is even establishing said location by incrementing the value of said integer representation by a fixed odd amount and using the result value to represent said location.

17. Method according to claim 15 including the step of providing addressable storage means subject to shared access by both the one unit and the designatable other units and wherein said method includes causing said other unit to use said ancillary information to effect access to an associated address in said storage means either during or after execution of said initiating instruction.

* * * * *